May 30, 1950 R. AUBERT 2,509,716

ARRANGEMENT FOR SECRET RADIO TELEPHONY

Filed May 2, 1947 2 Sheets-Sheet 1

Inventor
ROGER AUBERT
By Haseltine, Lake & Co.
Agents

ARRANGEMENT FOR SECRET RADIO TELEPHONY

Filed May 2, 1947 2 Sheets-Sheet 2

Inventor
ROGER AUBERT
By
Haseltine, Lake & Co.
Agents

Patented May 30, 1950

2,509,716

UNITED STATES PATENT OFFICE 2,509,716

ARRANGEMENT FOR SECRET RADIO TELEPHONY

Roger Aubert, Paris, France, assignor to Societe Francaise Radio Electrique, a corporation of France Application May 2, 1947, Serial No. 745,624
In France May 8, 1944

Section 1, Public Law 690, August 8, 1946
Patent expires May 8, 1964

3 Claims. (Cl. 250—6)

Carrier wave devices normally used for effecting secret wireless telephone communications are known. They essentially consist in a transposal or a reversal of the modulation frequencies, which is associated with a frequency modulation at slow cadence of the aggregate (wobbling). Such devices, however, only provide a relative security.

In order to obtain greater secrecy, devices have been constructed in which the band of telephone frequencies is divided into a number of bands which are themselves reversed and then mixed, the various possible combinations being synchronously changed at the transmitting end and at the receiving end. This system is efficient, but it is cumbersome and expensive, particularly in the case of multiplex communications in which it requires one device for each channel. Furthermore, it often gives mediocre quality when the transmission undergoes considerable selective weakening.

When use is made of transmissions in which the carrier is suppressed or reduced to a pilot wave of low power, as in the single band transmission, the system of reversal of the bands offers no advantage since the modulation bands are, in practice, transmitted alone in the ether and their "directions" cannot be detected. On the other hand, a wobbling system on the bands and the pilot wave as a whole, which is fairly simple to obtain at the transmitting end, is very delicate to use at the receiving end owing to the synchronism to be obtained between the local demodulating carrier wave and the pilot wave. Finally, the use of the mixed band system remains expensive.

The present invention has for its object a secrecy device which is more particularly applicable to single band transmission. Its principle essentially consists in leaving the pilot wave fixed and imposing on the modulation bands as a whole either abrupt transposals of fixed values, or continuous transposals (wobbling of the side bands only) effected synchronously at the transmitting end and at the receiving end.

This synchronism is fairly easy to obtain, since it is only produced on well-defined frequencies which are independent of the high frequency carrier frequencies and which are of comparatively low values.

The invention will be described, by way of a non-limitative example, in its application to a two-channel single band system in which, according to the circuit commonly used at the transmitting end, one of the transmissions is normally fixed relatively to the pilot wave in, for instance, the lower side band, the other being reversed and transposed in the upper side band so as to leave between the two bands a width of band substantially equal to the width of the useful band and within which most of the speech falls.

Figure 1:
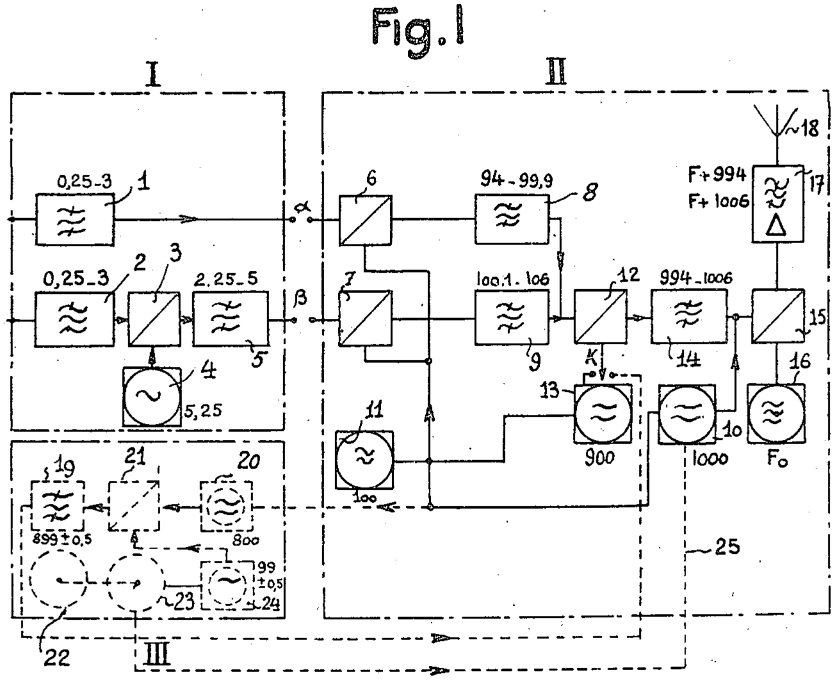
Figure 2:
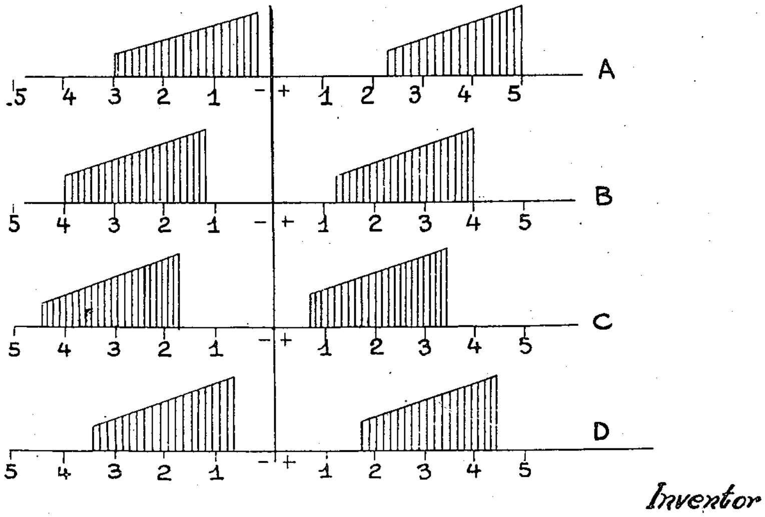
Figure 3:
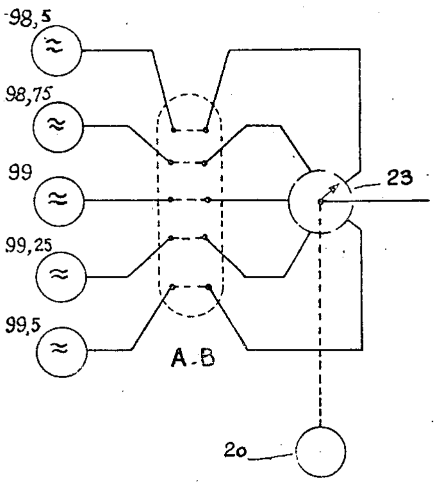
Figure 4:
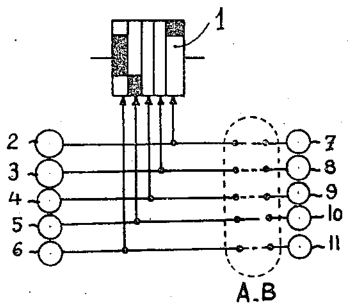
Figure 5:
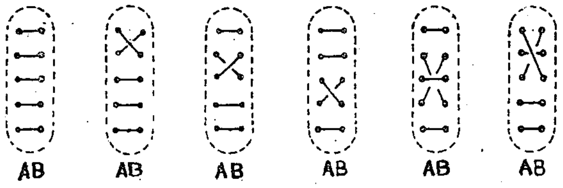
Figure 6:
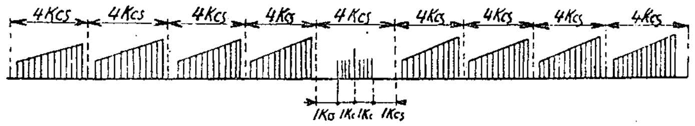

In the accompanying drawings:

Fig. 1 is a wiring schematic diagram of a transmitter according to the invention;

Figures 2A, 2B, 2C and 2D, give an indication of the different positions occupied by the spectrum consisting of the two lateral bands or channels when transposed as described;

Figures 3 and 5 show a device for obtaining the transposition according to a given code, while Figure 4 is a modification thereof; and Figure 6 is a view similar to that of Figures 2A to 2D of a spectrum constituted by a multiplicity of adjacent channels.

Two first filters 1 and 2 limit the band-pass of each channel to the values 0.25–3 kilocycles/second. A balanced modulator 3 excited by a generator 4 at 5.25 kc./s. reverses and transposes the channel 2 in the band 2.25–5 kc./s. which is isolated by a filter 5, the frequency 2.25 corresponding to the upper speech frequencies and the frequency 5 kc./s. to the lower frequencies. Each of the frequency bands then excites a balanced modulator, 6 and 7 respectively, to which is fed the output of a standard heterodyne 11 at 100 kc./s.

A quartz filter 8 which allows frequencies from 94 to 99.9 kc./s. to pass, isolates at the output of the modulator 6 the lower modulation band which extends, in this case, from 97 to 99.75 kc./s. A second quartz filter 9, which allows frequencies from 100.1 to 106 kc./s. to pass, isolates, at the output of the modulator 7, the upper modulation band which extends from 102.25 to 105 kc./s. Reference is made to the fact that the 5.9 kc./s. band-passes used for the filters 8 and 9 correspond to standard values which enable the transmitter to transmit broadcasting modulations. Finally, the two bands are mixed in the mixer 12.

A second transposal to 900 kc./s. is effected by the generator 13 which is synchronised with the generator 11; then a filter 14, which allows the 994–1006 kc./s. band to pass, is used to feed the modulating stage of the transmitter 15 which is excited by the pilot frequency 16 and which feeds the aerial 18 through the intermediary of amplifying stages 17. A harmonic generator 10, which is excited by the generator 11 at 100 kc./s., enables the carrier frequency at 1000 kc./s. to be added to the aggregate, at the desired level.

The band transmitted through the ether occupies in this case the position shown in Figure 2A, in which $F_0$ designates the pilot frequency 16 (Figure 1). The members shown in Figure 1 in the chain-line rectangles I and II therefore correspond to a single-band transmission arrangement connected in accordance with known technique.

The secrecy device according to the invention includes a number of members which are shown in dotted lines in the chain-line rectangle III of Figure 1.

First of all, in order to enable a modulation of $\pm 0.5$ kc./s. for instance to be effected on the useful bands, it is necessary to leave at least this space between the pilot wave and each of said bands. This condition will be obtained by exciting the modulator 12, no longer through the intermediary of the generator 13 at 900 kc./s., but through the intermediary of a generator 19 at 899 kc./s., a reversing switch K enabling the modulator 12 to be connected either to the generator 13 (communications without a secrecy device) or to a generator 19 (communications with a secrecy device). The bands of the channels 1 and 2 in this case occupy the positions shown in Figure 2B leaving between each of them and the pilot wave an interval of 1.25 kc./s., the carrier frequency at 1000 kc./s. not having moved.

The generator 19 will either be modulated at a frequency of $\pm 9.5$ kc./s. for instance, at the cadence of one or of two modulations per second, or transposed in an abrupt manner to several frequencies adjacent 899 kc./s., for instance: 898.5—898.75—899—899.25—899.5 kc./s. at the rate of one transposal about every five or six seconds. In these conditions, the two bands will occupy the extreme positions shown in Figures 2C and 2D, but will still retain between them a constant interval equal to that normally used.

In order to obtain a correct result and avoid at the receiving end a transposal of telephone frequencies which would alter the timbre of the voice, it is necessary for the frequencies of the transposal generators not to differ from their theoretical values by more than about $\pm 2$ cycles per second. For this purpose, it is obviously possible to use, for the generator 19, five quartz oscillators directly tuned to the desired frequencies. But these oscillators should have a frequency stability of $\pm 2$ millionths, which stability is difficult to maintain under working conditions without special precautions.

According to the invention, it is preferable to obtain the frequencies in the following manner:

A harmonic generator 20, which is excited by the standard generator 11 on 100 kc./s., supplies, without any possibility of error, the frequency of 800 kc./s.; this frequency is modulated in a modulator 21 by five frequencies in the vicinity of 99 kc./s. and respectively equal to 98.5—98.75—99—99.25—99.5 kc./s. supplied by an oscillator 24, in order thus to produce the five desired frequencies which are then isolated by a selective circuit taking the place of the generator 19. The tolerance of $\pm 2$ cycles/sec. is then transferred to the five oscillators on 98.5 . . . 99.5 kc./s., which then only require to have a relative stability of $\pm 0.00002$, which can be correctly obtained in practice.

On the other hand, owing to the comparatively low frequencies employed, it is possible to use, for the two generators 11 and 24, quartz oscillators of a known type which have a low temperature coefficient over a large range of temperatures and consequently do not require a thermostat.

Commutation of the five frequencies is obtained by means of a distributor 23 driven by a constant speed motor 22 in accordance with a predetermined code, the different combinations being varied synchronously at the receiving end by means of a synchronous distributor.

In order to obtain a correct commutation of the various heterodynes, the distributor may advantageously comprise a system of optical screens which cover or uncover, according to a predetermined code, five luminous beams, the latter, by acting on photo-electric cells, controlling the action of the amplifiers to which the five heterodynes are fed.

The distributor 23 is connected to the various oscillators through the intermediary of a plug and socket combination AB Figure 3. To each position of the distributor there corresponds the utilisation of one of the five oscillators. The cycle of sequence in time of the various frequencies is altered every time the terminals A and B of the plug and socket combinations are connected in a different manner. This can be obtained by arranging between the terminals A and B plugs with two rows of contacts, similar to those shown in Figure 5 in which are indicated, by way of example six different combinations.

Finally, it is obvious that the aforesaid plugs can be replaced by multi-way combination switches, giving a predetermined "code" for each position.

Transmission of the synchronism signals which is necessary for driving the synchronous distributor in phase at the receiving end, may be effected through the intermediary of an auxiliary carrier frequency. But it is also possible to transmit the synchronism signals by regularly stopping, at each modulation period and for a brief instant, the general carrier frequency on 1000 kc./s. by means of the circuit 25 controlled by the transmitting distributor 23 (Figure 1). Moreover, these stoppages will have practically no effect at the receiving end if the control system for the local wave is astatic, which is generally the case.

The system which has just been described produces synchronism of the "codes" at the transmitting end and at the receiving end by means of synchronous distributors. The invention also provides, as a modification, for controlling the changes of transposal, not by means of synchronous distributors, but by transmitting control frequencies which may be fixed outside the useful bands and which are set up at the transmitting end at each change of combination, these frequencies then setting up the corresponding combination at the receiving end.

Figure 4 shows diagrammatically the device used. A five-drum distributor 1 at the transmitting station rotates at any speed. Each drum simultaneously controls the starting of one of the five transposal oscillators 2, 3, 4, 5, 6, and the setting up of the corresponding pilot frequency 7, 8, 9, 10, 11; only one combination, of course, is transmitted at a time. Moreover, as hereinbefore, the distributor may advantageously be of the optical type. Furthermore, no distributor exists at the receiving end, where the starting of the various transposal oscillators is directly controlled by the corresponding pilot frequencies.

The foregoing system eliminates the drawback which may be caused by having to make two distributors operate in synchronism at the transmitting end and at the receiving end; but it has the disadvantage of being more sensitive to selective weakening and of causing a risk of missing a commutation owing to lack of pilot frequency. However, if the communication is sufficiently secure by using two simultaneous control frequencies for instance, the system may be used with advantage.

As regards the change of code, this may again be effected either by means of a plug and socket combination or by means of a combination switch, AB.

According to the invention, if, instead of sudden variations of the transposal frequencies, a continuous variation of these frequencies is used, the generator 19 may advantageously comprise a precision quartz oscillator having a mean frequency of 899 kc./s., to which is imparted a contiouous variation of ±500 cycles per second by means of a variable condenser connected across the terminals of the crystal according to any known diagram. The variable condenser is driven by the constant speed motor 22 (Figure 1).

Finally, in order to obtain speeds of variation which are as nearly identical as possible at the transmitting end and at the receiving end, this condenser may be constructed by means of elements of simple shapes, which can be readily reproduced by mechanical means, for instance, by means of eccentric circular blades.

The apparatus which is used at the receiving end is, in all cases, the exact replica of that which is used at the transmitting end and which has just been described (Figure 1).

The receiver comprises a high frequency amplifying device, a heterodyne tuned to the same frequency $F_0$ as the transmitting pilot frequency, a first intermediate frequency amplifier on 1 megacycle—6 kc./s. and a second intermediate frequency amplifier on 100 kc./s.—6 kc./s. The receiver therefore has the same modulators and the same generators as the transmitter, and the variation of the transposal frequencies is obtained by the same means.

Apart from the special members at the receiving end proper (automatic sensitivity control, frequency control of the high frequency heterodyne, etc.), the additional members relating to the secrecy device are the circuit for selecting the synchronism signals and the means for controlling the synchronous distributor from said signals. Moreover, these selecting and controlling members may be constructed in accordance with any known means.

Finally, it is understood that, although the invention has been described for a two-channel system, it also applies to simplex systems, but more particularly to multiplex systems with more than two channels, in which the same system ensures the secrecy of all the channels, contrary to the mixed band secrecy systems which require one set of apparatus per channel.

Thus, if the transmission through a large number of channels is contemplated (ten or twelve, for instance), said channels being arranged in accordance with the technique of coaxial cables, the pilot wave will be located either at one end of the general band, or preferably in the middle by sacrificing one of the channels, as indicated in Figure 6. The pilot wave will be located, for instance, in the middle of a free channel of 4 kc./s.

If necessary, the control frequencies may be located in an interval of ±1000 cycles/sec. around this carrier and it will thus be easy to obtain total transposals of the modulation bands from ±0.6 kc./s. to ±0.8 kc./s.

I claim:

1. In a twin-channel radio signalling system, in combination: means to produce two audible-frequency messages, means to invert one of them, means for modulating an intermediate frequency carrier wave by the direct and the inverted messages, means for periodically modulating the frequency of said carrier wave within a small range and at a very slow rate, by successive steps, means to suppress this carrier and the two lower side bands produced, means for transmitting the upper side bands, means for adding to the two transmitted upper sidebands a pilot frequency wave, intermediate the innermost limits of these two sidebands, means to regenerate the carrier wave at the receiver, means to synchronize the frequency shifts of that regenerated carrier with those of the suppressed one, means to demodulate the received sidebands by the regenerated carrier.

2. In a radio signalling system as claimed in claim 1, synchronizing means comprising, in the transmitter: a series of frequency-stabilized oscillators, corresponding respectively to the modulation steps, a rotating member with a constant angular speed, means controlled by this member and effecting simultaneously, at each frequency shift included in the frequency modulation cycle the switching-in of one of these oscillators, the switching-out of the oscillator corresponding to the previous step and the sending of one or several side frequencies, characteristic of the switched-in oscillator and located out of the transmitted signal frequency band, the said synchronizing means comprising, at the receiver, a set of heterodyne oscillators having respectively the same constant operating frequencies as the frequency modulating oscillators in the transmitter, means to pick the side frequencies, means controlled by these frequencies and effecting the same switching operations as in the transmitter.

3. A secrecy single side-band radio signalling system comprising two separate single band transmission channels, a source of two separate messages, means for introducing one of said messages as an upper side-band into one of the transmitting channels and the other as a lower side-band in the other transmision channel, means for bringing together the two side-bands into only one spectrum, means for shifting the whole of said spectrum, toward and from a fixed frequency in accordance with a predetermined code, the said shifting means comprising a variable frequency generator device including means for producing the variable frequency by modulating a harmonic of a standard frequency wave by a set of waves at fixed adjacent frequencies, and means for putting into service said last mentioned frequencies successively and periodically in an order varying according to a predetermined time schedule constituting said predetermined code, modulating means for associating said spectrum with a reduced amount of carrier wave at a constant frequency and means for radiating the output of said modulating means.

ROGER AUBERT.

(References on following page)

REFERENCES CITED

The following references are of record in the file of this patent:

UNITED STATES PATENTS

| Number | Name | Date |
|---|---|---|
| 1,495,470 | Farrington | May 27, 1924 |
| 1,502,889 | Van Der Bijl | July 29, 1924 |
| 1,542,565 | Mathes | June 16, 1925 |
| 1,641,431 | Horton | Sept. 6, 1927 |
| 1,907,109 | Hinton | May 2, 1933 |
| 1,992,441 | Purington | Feb. 26, 1935 |
| 2,095,050 | Beverage | Oct. 5, 1937 |
| 2,156,278 | Dekker | May 2, 1939 |
| 2,179,106 | Taylor | Nov. 7, 1939 |
| 2,233,183 | Roder | Feb. 25, 1941 |
| 2,309,678 | Smith | Feb. 2, 1943 |
| 2,358,382 | Carlson | Sept. 19, 1944 |
| 2,395,432 | Sprague | Feb. 26, 1946 |
| 2,398,694 | Case | Apr. 16, 1946 |
| 2,399,469 | Cook | Apr. 30, 1946 |